United States Patent Office 3,272,737
Patented Sept. 13, 1966

3,272,737
SEPARATION OF ACIDS BY DIALYSIS WITH
ANION-EXCHANGE MEMBRANES
Robert D. Hansen and Robert M. Wheaton, Midland, Mich., assignors to The Dow Chemical Company, Midland, Mich., a corporation of Delaware
No Drawing. Filed Nov. 2, 1964, Ser. No. 408,381
6 Claims. (Cl. 210—22)

This is a continuation-in-part of application Serial No. 258,623 filed by R. D. Hansen and R. M. Wheaton on February 14, 1963, now abandoned.

This invention concerns an improved dialysis process for separating strong and weak acids in aqueous solution. More particularly it concerns a process for separating a highly ionized inorganic or organic acid from a weaker acid by dialysis with an anion-exchange membrane.

In conventional dialysis, dissolved and suspended solutes in aqueous mixtures are separated by an inert, non-ionic membrane primarily on the basis of molecular size. The dialysis membranes are essentially inert to mass flow but porous enough to permit diffusion of low molecular weight species through the membrane. For example, sodium chloride or sodium hydroxide diffuse through a cellulosic membrane while high molecular weight solutes such as colloidal viscose or a protein are retained in the dialysate.

Prior to recent synthetic developments, the poor strength and stability of the available membranes limited the use of dialysis essentially to laboratory practice. However, the availability of new membranes with greatly increased strength and durability has now vastly enlarged the utility of dialysis processes. For example, the recovery of sulfuric acid from copper refinery streams by dialysis is now commercially feasible.

Normally non-ionic membranes have been used in dialysis. Such membranes contain essentially no ionic functional groups and any ionic species adsorbed by such membranes from aqueous solution are readily removed by rinsing with water. Although strong acids can be removed from aqueous solution by dialysis with a non-ionic membrane, such membranes have little if any selectivity for the separation of strong and weak acids in aqueous solution, for example, for separating phenol and hydrochloric acid or iminodiacetic acid and a mineral acid.

Furthermore, in the dialysis of aqueous acid with a non-ionic membrane, osmotic transport or transfer of water in the reverse direction, i.e., from the rinse water stream through the membrane into the dialysate, normally occurs. Often dilution of the dialysate is several fold or more. In separating sulfuric acid from a water-soluble sulfonated polymer, the polymer concentration in the dialysate was reduced from 5.0% to 1.25% when a non-ionic membrane was used. Such dilution is quite undesirable when recovery of the residual solute is necessary.

It has now been discovered that use of an anion-exchange membrane greatly increases the efficiency of the dialysis separation of strong and weak acids in aqueous solution. With an anion-exchange membrane, the acid strength becomes a major factor in the process selectivity. With low molecular weight organic and inorganic acids, relatively rapid transfer through the anion-exchange membrane occurs with an acid having an ionization constant, a first ionization constant in the case of polybasic acids, greater than $1.0 \times 10^{-3}$ ($pK_a$, 3.00).

In addition it has further been discovered that the anion-exchange membrane greatly reduces dilution of the dialysate by osmotic transport. In many cases separations are achieved with essentially no dilution of the dialysate. At times the dialysate effluent is more concentrated than the initial feed solution. This reduction in osmotic transport is of obvious practical value. Not only is the subsequent recovery of the weak acid from the dialysate enhanced by avoiding dilution, but the membrane area required for a given separation is less since the driving force for dialysis is not reduced by dilution.

As used herein, the term "strong acid" refers to low molecular weight inorganic and organic acids having an ionization constant greater than $1.0 \times 10^{-3}$ in dilute aqueous solution at 25° C. A molecular weight of 200 or less is essential for rapid dialysis. For polybasic acids the first ionization constant is controlling.

A "weak acid" is an acid having an ionization constant less than $1.0 \times 10^{-3}$ in dilute aqueous solution at 25° C.

Techniques for determining ionization constants are well known. The values used herein are taken from a recent review by Albert and Serjeant "Ionization Constants of Acids and Bases," John Wiley & Sons, Inc., New York, 1962. Also for convenience ionization constants are often expressed in terms of their negative logarithm or $pK_a$ value. A $pK_a$ value of 3.00 corresponds to an ionization constant of $1.00 \times 10^{-3}$. Thus in terms of $pK_a$, a "strong acid" as defined herein has a value of 3.00 or less while a "weak acid" has a value greater than 3.00.

The improved acid dialysis process using an anion-exchange membrane is particularly advantageous in the separation of low molecular weight water-soluble strong and weak acids. By "water-soluble" is meant solubility of at least 0.1 wt. percent at 25° C. It is particularly effective with strong mineral acids such as hydrochloric acid, hydrobromic acid, nitric acid, perchloric acid, and sulfuric acid which have $pK_a$ values of —1 or less. It is also suitable for phosphoric acid ($pK_a$, 2.1), sulfurous acid ($pK_a$, 1.8) and periodic acid ($pK_a$, 1.55). Examples of strong organic acids which can be separated by this dialysis process include ($pK_a$ values in parentheses): methane sulfonic acid (about 0), trichloroacetic acid (0.66 at 20° C.), p-toluenesulfonic acid (about 0.6), dichloroacetic acid (1.25 at 18° C.), oxalic acid (1.27), maleic acid (1.92), fluoroacetic acid (2.57), chloroacetic acid (2.85), malonic acid (2.86) and o-phthalic acid (2.95).

Water-soluble weak inorganic acids include boric acid (9.2), carbonic acid (6.4), hydrocyanic acid (9.1), hypochlorous acid (7.3) and nitrous acid (3.4). However, the process is most useful in the recovery of water-soluble organic acid such as amino acids, hydroxy acids, mercapto acids and phenols all of which have $pK_a$ values greater than 3.00. Typical examples of weak organic acids include acetic acid, formic acid, n-octanoic acid, acrylic acid, cyclohexanecarboxylic acid, benzoic acid, phenylacetic acid, methoxyacetic acid, glycolic acid, lactic acid, citric acid, methioacetic acid, thioglycolic acid, 2-mercaptopropionic acid, alanine, glycine, leucine, methionine, iminodiacetic acid, phenol, resorcinol, hydroquinone and sulfanilic acid.

An essential element in the present invention is the anion-exchange membrane. Preferably a strong-base anion-exchange membrane with quaternary ammonium functional groups is used to obtain the improved acid dialysis. The anionic form of the membrane is not important. Although conveniently prepared and employed as flat sheets, the anion-exchange membrane can be used in other forms such as tubes and hollow fibers. Such membranes must of course be essentially impervious to mass flow but porous enough to permit transfer by diffusion.

Suitable anion-exchange membranes are available commercially, for example, American Machine & Foundry AMF-A60 membrane; Ionics, Inc., A-111-A membrane; and Nalco Chemical Company Nalfilm 2 membrane.

These membranes have an ion exchange capacity of at least 1.0 meq./g. dry membrane. Quaternary ammonium anion-exchange membranes can be prepared as described by Juda and McRae in U.S. Patent Re. 24,865 and by Tsunoda and Seko in U.S. Patent 2,883,349. Alternately, styrene can be grafted on to a polyethylene film or tube and then anion-exchange groups substituted on the aromatic nuclei of the copolymer by the Tsunoda and Seko process.

In the practice of the present invention, a conventional plate and frame dialysis apparatus can be conveniently used with thin anion-exchange membrane sheets. A pair or advantageously multiple pairs of anion-exchange membranes are used, each pair forming a separate compartment with the membranes arranged parallel to each other as opposite walls of the compartment. Preferably, the membranes are held in a vertical position. In units having multiple compartments, alternate cells are interconnected either in series or in parallel.

The dialysis unit is designed to pass the dialysis feed liquor into one compartment and rinse water into the two adjacent ones so that the membranes are in contact on one side with dialysis liquor and on the other with water. Countercurrent flow of the feed liquor and water is preferred. Also in a unit with vertical membranes, the feed liquor preferably flows upward through one compartment while rinse water passes downward in the two adjacent ones.

As in conventional dialysis operations, the efficiency of the separation of the highly ionized acid from the feed liquor is dependent upon such factors as the properties of the membrane including its porosity and exchange capacity, the flow rate per unit surface area of membrane, the ratio of rinse water to dialysis feed liquor, the concentration of the feed mixture, the process temperature, etc. For example, it is well known that the driving force for dialysis is proportional to the difference in chemical potential on the two sides of the membrane. Thus, for rapid removal of the strong acid from the feed liquor, its concentration in the rinse water should be kept low, conveniently by using a more rapid flow of rinse water. Hence in the improved acid dialysis process, a flow ratio of rinse water to dialysis feed of at least one is desirable. Often flow ratios of 10 or 20 are advantageous in achieving a high removal of acid from the feed liquor.

In general, dialysis units operate effectively at atmospheric pressure, although a slight positive pressure on one side or other of the membrane may be desirable to minimize flexing of the membrane. Operation at ambient temperature is usually convenient. However, commercial anion-exchange membranes are stable to at least 60° C. and higher operating temperatures within the limits of the membrane stability can be used.

Alternative operating techniques will be apparent to those skilled in the art of dialysis and ion exchange. Optimum operating conditions for a particular system within the general scope of this invention can be determined in routine manner.

To illustrate further the present invention and the advantages obtained therefrom, the following examples are given without limiting the invention thereto. Unless otherwise specified, all parts and percentages are by weight.

EXAMPLE I

HCl-acetic acid (A) A conventional plate and frame dialysis unit was fitted with two 25.4 cm. x 33.0 cm. American Machine and Foundry AMF 101 anion-exchange membranes. This is a quaternary ammonium membrane with the functional groups bonded to a polyethylene-styrene copolymer matrix. The membranes used had an exchange capacity of 1.4 meq./1 g. dry wt., a wet thickness of 6 mils, and about a 12% gel water content. An aqueous solution 0.99 N in HCl ($pK_a$ −7) and 1.02 N in acetic acid ($pK_a$ 4.756) was fed upwardly through the center dialysis compartment at a rate of 5.14 ml./min. Water was passed countercurrently through the outer compartments at a flow rate of 40.5 ml./min. Under steady state conditions, 43.0% of the HCl was transferred from the dialysate to the rinse water. At the same time only 12.7% of the acetic acid was transferred into the rinse water stream. Also the dialysate eluent had a flow rate of 5.10 ml./min. indicating essentially no dilution of the dialysate by osmotic transport of water from the rinse stream.

(B) A similar experiment was made using a neutral, non-ionic membrane, Nalfilm D–130 from Nalco Chemical Company. This membrane had a water content of 65% and a wet thickness of 4.2 mils. Because of the greater porosity of the membrane it was necessary to increase the dialysis feed rate to 41.0 ml./min. to obtain about the same percent HCl transfer. With a dialysate feed 1.02 N in HCl and 0.98 N in acetic acid, a feed rate of 41.0 ml./min., and a rinse water flow of 38.4 ml./min., 44.0% of the HCl and 21.8% of the acetic acid were transferred from the dialysate to the rinse water under steady state conditions. At the same time the dialysate eluent flow was 42.1 ml./min., an increase of 1.1 ml./min. through osmosis from the rinse water.

EXAMPLE II

Chloroacetic acid-acetic acid

Using the same cell and membranes as Example I(A) a solution 1.05 N in chloroacetic acid ($pK_a$ 2.85) and 0.90 N in acetic acid ($pK_a$ 4.756) was dialyzed against water. The dialysate feed rate was 5.14 ml./min. with a rinse water flow of 40.5 ml./min. When steady state conditions were achieved, 15.5% of the initial chloroacetic acid and 7.8% of the acetic acid was present in the rinse stream. The dialysate eluent from the center compartment had a flow rate of 5.04 ml./min. indicating no dilution of the dialysate by water osmosis from the rinse stream.

EXAMPLE III

Strong organic acids (A) Using the dialysis cell described in Example I fitted with two American Machine & Foundry AMF–60 membranes having an exchange capacity of 2.0±0.2 meq./g. dry wt., a wet thickness of 12±1 mils and a gel water content of 22±5%, a 1.0 N solution of chloroacetic acid ($pK_a$ 2.85) was dialyzed against water using a dialysate feed rate of 9.33 ml./min. and a rinse water flow of 40.4 ml./min. Under steady state conditions, 16.2% of the chloroacetic acid was removed by dialysis. The dialysate eluent flow was 9.11 ml./min. indicating no dilution with rinse water.

(B) Using a standard dialysis cell with the two compartments separated by an AMF 101 anion-exchange membrane and fitted with burets to measure liquid transport across the membrane, solutions of 0.5 M and 1.0 M oxalic acid ($pK_a$ 1.27) were dialyzed against water. In both instances, the volume of the acid solution decreased with time and oxalic acid was transferred into the water compartment.

Similar results have been observed with chloroacetic acid, dichloroacetic acid ($pK_a$ 1.25), o-phthalic acid ($pK_a$ 2.95) and other strong organic acids having a $pK_a$ of less than 3.00.

We claim:
1. In a dialysis process for separating low molecular weight acids in aqueous solution, the improvement which comprises using an anion-exchange membrane as the dialysis membrane to separate a strong acid having an ioni- zation constant less than $1.0 \times 10^{-3}$ from a weak acid having an ionization constant greater than $1.0 \times 10^{-3}$.

2. The process of claim 1 wherein the dialysis membrane is a strong-base quaternary ammonium anion-exchange membrane.

3. The process of claim 2 wherein the dialysis membrane has an anion-exchange capacity of at least 1.0 meq./g. dry membrane.

4. The process of claim 2 wherein the strong acid is an inorganic acid.

5. The process of claim 2 wherein the strong acid is an organic acid.

6. A process for the separation of chloroacetic acid from acetic acid in aqueous solution which comprises passing the aqueous solution through a dialysis cell having a strong-base anion-exchange membrane as the dialysis membrane and recovering an essentially undiluted dialysate eluent containing an increased mole ratio of acetic acid to chloroacetic acid.

References Cited by the Examiner
UNITED STATES PATENTS 3,132,094   5/1964   McKelvey et al. ____ 210—500 X

OTHER REFERENCES

Lightfoot et al.: "Ion Exchange Membrane Purification," Industrial and Engineering Chemistry (pages 1579–1583 relied upon), August 1954.

References Cited by the Applicant
UNITED STATES PATENTS 2,433,879   1/1948   Wretlind.
2,772,237   11/1956   Bauman.
2,883,349   4/1959   Tsunoda.

MORRIS O. WOLK, *Primary Examiner.*

E. G. WHITBY, *Assistant Examiner.*